United States Patent
Kedma et al.

(10) Patent No.: US 9,824,217 B2
(45) Date of Patent: *Nov. 21, 2017

(54) RUNTIME DETECTION OF SELF-REPLICATING MALWARE

(71) Applicants: Gabriel Kedma, Omer (IL); Doron Havazelet, Omer (IL)

(72) Inventors: Gabriel Kedma, Omer (IL); Doron Havazelet, Omer (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/338,399

(22) Filed: Oct. 30, 2016

(65) Prior Publication Data

US 2017/0046512 A1    Feb. 16, 2017

Related U.S. Application Data

(63) Continuation of application No. 13/663,610, filed on Oct. 30, 2012, now Pat. No. 9,483,642.

(51) Int. Cl.
*G06F 21/56*   (2013.01)
*G06F 11/30*   (2006.01)

(52) U.S. Cl.
CPC ........ *G06F 21/566* (2013.01); *G06F 11/3003* (2013.01); *G06F 21/56* (2013.01); *G06F 2201/865* (2013.01); *G06F 2221/034* (2013.01)

(58) Field of Classification Search
CPC ............ G06F 21/566; G06F 2221/034; G06F 11/3003; G06F 21/56; G06F 2201/865
USPC ........................................ 726/22, 23, 24, 25
See application file for complete search history.

(56) References Cited

U.S. PATENT DOCUMENTS

| | | | |
|---|---|---|---|
| 7,162,626 B2 | 1/2007 | Zimmer et al. | |
| 7,299,495 B2 | 11/2007 | King et al. | |
| 7,634,262 B1 | 12/2009 | Li | |
| 2003/0185369 A1 | 10/2003 | Oliver et al. | |
| 2004/0181677 A1* | 9/2004 | Hong | H04L 63/145 713/188 |

(Continued)

OTHER PUBLICATIONS

Advisory Action Before the Filing of An Appeal Brief dated May 5, 2015 From the US Patent and Trademark Office Re. U.S. Appl. No. 13/663,610.

(Continued)

*Primary Examiner* — Kambiz Zand
*Assistant Examiner* — Abiy Getachew

(57) ABSTRACT

A method for detecting malicious active processes and self replicating executable binary files on a computing device. The method comprises monitoring in runtime active processes running on a computing device, extracting unique identifier(s) of each of the active processes which maps the active process to executable binary file(s) containing executable code of the active process, monitoring in runtime creation and modification of data files hosted by the computing device, identifying executable binary files among the data files, monitoring concurrent operation of logical sensors which detect malicious behavioral patterns of the active processes and maintain one or more lists of malicious behavioral pattern findings, and detecting malicious active process(es) of a malware from the active processes and self-replicating executable binary file(s) of the malicious active process(es) according to a match between the respective unique identifier(s), the malicious behavioral pattern findings and at least one the executable binary files.

14 Claims, 8 Drawing Sheets

(56) References Cited

U.S. PATENT DOCUMENTS

| | | | |
|---|---|---|---|
| 2004/0237079 A1* | 11/2004 | Cox | G06F 8/65 717/168 |
| 2005/0015633 A1 | 1/2005 | Kang | |
| 2007/0038689 A1 | 2/2007 | Shinkai | |
| 2008/0235756 A1 | 9/2008 | Cohen et al. | |
| 2008/0295153 A1 | 11/2008 | Cheng et al. | |
| 2011/0164822 A1 | 7/2011 | Jegou et al. | |
| 2011/0277035 A1 | 11/2011 | Singh et al. | |
| 2014/0123280 A1 | 5/2014 | Kedma et al. | |

OTHER PUBLICATIONS

Advisory Action Before the Filing of An Appeal Brief dated Apr. 28, 2016 From the US Patent and Trademark Office Re. Appl. No. 13/663,610.
Applicant-Initiated Interview Summary dated Oct. 1, 2015 From the US Patent and Trademark Office Re. U.S. Appl. No. 13,663,610.
Notice of Allowance dated Aug. 12, 2016 From the US Patent and Trademark Office Re. U.S. Appl. No. 13/663,610.
Official Action dated Jul. 8, 2015 From the US Patent and Trademark Office Re. U.S. Appl. No. 13/663,610.
Official Action dated Jan. 20, 2016 From the US Patent and Trademark Office Re. U.S. Appl. No. 13/663,610.
Official Action dated Feb. 24, 2015 From the US Patent and Trademark Office Re. U.S. Appl. No. 13/663,610.
Official Action dated Aug. 27, 2014 From the US Patent and Trademark Office Re. U.S. Appl. No. 13/663,610.

* cited by examiner

RUNTIME DETECTION OF SELF-REPLICATING MALWARE

RELATED APPLICATION

This application is a continuation of U.S. patent application Ser. No. 13/663,610 filed Oct. 30, 2012.

The contents of the above applications are all incorporated by reference as if fully set forth herein in their entirety.

FIELD AND BACKGROUND OF THE INVENTION

The present invention, in some embodiments thereof, relates to malicious software (malware) detection and, more particularly, but not exclusively, to runtime detection of self replicating and self-modifying malware.

Malware is a general term for a variety of hostile, intrusive and/or annoying uninvited software contaminating a computing device. Malware generally appears in the form of executable binary files designed to exploit a device or the data it contains without consent. Exploitation may take a variety of forms, such as disruption of device operation, sensitive information gathering, unauthorized access to device systems or the like.

Malware is typically provided with self-replication and/or self-modification capabilities, while preserving the malicious intention of the original code. Malware mutations typically spread across devices and run without being detected, shut down, or deleted by the user or security software.

Reference is made to FIG. 1, which is conceptual scheme representing malware functionality. Activities which may take place as part of malware lifecycle on a computing device include self-replication and/or multiplication, malware clone creation and distribution, as well as malware penetration into additional, optionally neighboring computing devices and systems. Penetration may include manipulation of new devices' detectors to disguise the malware's operation affecting the newly penetrated devices, whether harmless or malicious, such as but not limited to device resource consumption. Malware may also mutate to avoid signature-based detection, and optionally re-replicate in a mutated form. Reference is also made to FIG. 2, which is a schematic flowchart demonstrating detailed operation of self-replicating malware. The flowchart commences with creation of a replicator process, optionally disguised as a useful application which performs harmless actions, to deceive a human user or malware detection programs. A replicator process typically reads its own executable file from disk into memory to generate one or more modified clones which may be saved from memory into a disk file. The replicator process may then activate the one or more generated clones to create one or more cloned process replicas, proceed with its previous harmless operation, and optionally notify the one or more cloned replicas of termination.

The design of malware may include elements such as but not limited to Trojan horses concealing harmful or malicious payloads, installation of backdoors, and rootkits which hide existence of processes from standard detection methods to allow continued privileged access to the device and its resources. Malware may disguise itself by taking advantage of otherwise legitimate binary self modification techniques, in which binaries alter their own instructions while executing to reduce repetitive code and/or improve performance.

Modern programming tools which simplify development of executable code in the form of binary modules may be used by hackers to build an arsenal of crude self-modifying and replicating malware, optionally disguised as non-executable binary files. Operating systems may inadvertently load and run such malware.

Post-factum analysis of malware is more challenging to perform when files of the cloned replicas are disguised as non-executable code and the original malware's executable file is deleted, overwritten or replaced. The one or more cloned replicas may verify upon creation that the replicator process is shut down, and delete and/or overwrite the executable file of the replicator process to hide its harmful operation. The one or more cloned replicas may wait until triggered to perform malicious activity.

SUMMARY OF THE INVENTION

According to an aspect of some embodiments of the present invention there is provided a computerized method of detecting malicious active processes and self-replicating executable binary files on a computing device in runtime. The method comprises monitoring in runtime a plurality of active processes running on a computing device, extracting at least one unique identifier of each active process of the plurality of active processes which maps the active process to at least one executable binary file containing executable code of said active process, monitoring in runtime creation and modification of a plurality of files hosted by the computing device, identifying a plurality of executable binary files among the plurality of files, monitoring concurrent operation of a plurality of logical sensors which detect malicious behavioral patterns of the plurality of active processes and maintain at least one list of malicious behavioral pattern findings, and detecting at least one suspected malicious active process of a suspected malware from the plurality of active processes and a corresponding at least one self-replicating executable binary file of the plurality of executable binary files according to at least one match between respective at least one unique identifier, the malicious behavioral pattern findings, and at least one of the plurality of executable binary files.

Optionally, the at least one unique identifier consists of a file path of at least one of the plurality of executable binary files according to an executable code of one of the active processes it contains, and at least one of an address of entry point of a respective executable binary file and a pre-defined sequence of machine-code indicating self-replication.

More optionally, the method further comprises receiving and executing a defense policy of performing at least one response action upon detection of the at least one malicious active process and the at least one self-replicating executable binary file. Optionally, the at least one response action is a file response action selected from a group consisting of deleting, overwriting, marking, and monitoring the at least one self-replicating executable binary file. More optionally, the at least one response action is a process response action selected from a group consisting of monitoring, suspending, and terminating the malicious active processes suspected as malware.

More optionally, the method further comprises searching for at least one heuristic self-replication indication prior to performing the at least one response action. More optionally, the method further comprises employing analysis heuristics to perform calculations required for identification of malicious behavioral patterns of processes at runtime.

More optionally, the method further comprises maintaining a binary files list of the plurality of executable binary files and an active processes list of records each of at least one unique identifier of each active process, and wherein the detection of at least one malicious active process comprises comparing records in the binary files list and the active processes list.

More optionally, the method further comprises identifying a plurality of cloned files among the plurality of executable binary files, monitoring in runtime creation of at least one new process running on a computing device, extracting at least one unique identifier of the at least one new active process which maps the new active process to at least one executable binary file containing executable code of the new active process, and identifying the new active process as a cloned process according to a match between respective at least one unique identifier and at least one of the plurality of cloned files.

Optionally, the method further comprises receiving access to storage media and process management modules of the computing device.

Optionally, the method is implemented in user mode.

Optionally, the at least one list of malicious behavioral pattern findings is maintained by one of the plurality of logical sensors and is accessible to other logical sensors of the plurality of logical sensors. More optionally, the method comprises comparing the malicious behavioral pattern findings with records of a database to determine the defense policy. More optionally, records of the database contain information selected from known suspicious patterns, legitimate and illegitimate applications, and publishers' credibility ratings. More optionally, the malicious behavioral pattern findings are used to assess severity and fidelity of the self-replicating executable binary file and the severity and fidelity serve as criteria in determining a response action to be taken by the defense policy.

According to an aspect of some embodiments of the present invention there is provided a computer program product for detecting in runtime malicious active processes and self replicating executable binary files suspected as malware on a computing device. The computer program product comprises a computer readable storage medium which stores, first program instructions to monitor in runtime a plurality of active processes running on a computing device, second program instructions to extract at least one unique identifier of each active process of the plurality of active processes which maps the active process to at least one executable binary file containing executable code of the active process, third program instructions to monitor in runtime creation and modification of a plurality of data files hosted by the computing device, fourth program instructions to identify a plurality of executable binary files among the plurality of data files, fifth program instructions to monitor concurrent operation of a plurality of logical sensors which detect malicious behavioral patterns of the plurality of active processes and maintain at least one list of malicious behavioral pattern findings, and sixth program instructions to detect at least one malicious active process of a suspected malware from the plurality of active processes and at least one self-replicating executable binary file of the at least one malicious active process according to a match between respective at least one unique identifier, the malicious behavioral pattern findings and at least one of the plurality of executable binary files. Optionally, one or more of the computer program instructions are implemented in User Mode.

According to an aspect of some embodiments of the present invention there is provided a system for detecting in runtime malicious active processes and self replicating executable binary files suspected as malware on a computing device. The system comprises a processor, an interface module which acquires access to storage media and process management modules of the computing device, a process monitoring module which monitors in runtime a plurality of active processes running on the computing device, and extracts at least one unique identifier of each active process of the plurality of active processes which maps the active process to at least one executable binary file containing executable code of the active process, a file monitoring module which monitors in runtime creation and modification of a plurality of files hosted by the storage media and identifies a plurality of executable binary files among the plurality of files, and a self-replication detection module which detects at least one malicious active process of a malware from the plurality of active processes and at least one self-replicating executable binary file of the at least one malicious active process according to a match between respective at least one unique identifier and at least one of the plurality of executable binary files.

Optionally, the interface module further acquires at least one defense policy of a plurality of response actions to be performed on the at least one malicious active process and the at least one self-replicating executable binary file, and the system further comprises a defense policy execution module which executes the defense policy on each of the at least one malicious active process and each of the at least one self-replicating executable binary files.

Optionally, the plurality of response actions comprise at least one of a file operation selected from a group consisting of deleting, overwriting, marking, and monitoring the at least one self-replicating executable binary file; and process operations selected from a group consisting of monitoring, suspending, and terminating the at least one malicious active process suspected as malware.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
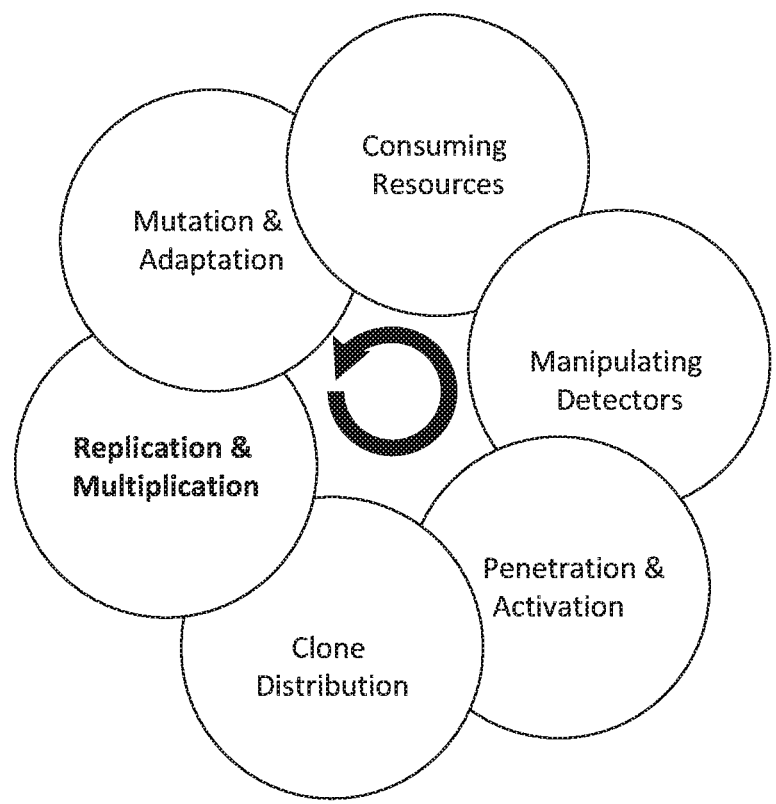
FIG. 1 is a conceptual scheme representing malware lifecycle and functionality.
Figure 2:
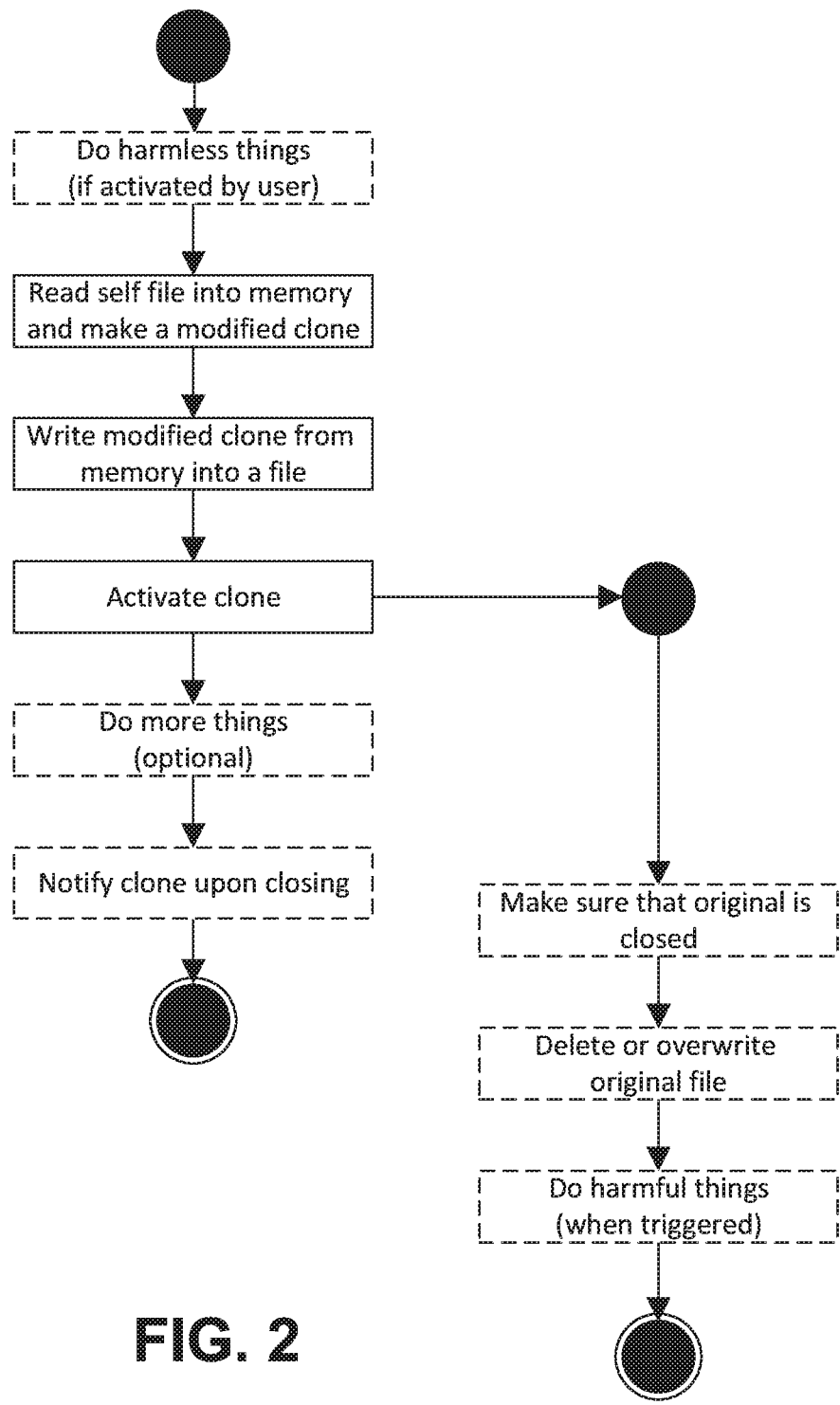
FIG. 2 is a schematic flowchart demonstrating operation of self-replicating malware.

The present invention, in some embodiments thereof, relates to malicious software (malware) detection and, more particularly, but not exclusively, to runtime detection of self-replicating and/or self-modifying malware in the form of self-replicating executable binary modules or executable binary files.

According to some embodiments of the present invention, there are provided methods and systems of detection and optional annulment of malware in the form of self-replicating executable binaries having self-modification capabilities. Detection may be performed at runtime of the executable binaries. Embodiments of the systems and methods may be implemented in different hierarchical protection rings used by a variety of operating systems to protect data and functionality from faults and malicious behavior.

Traditional security-related components such as anti-virus and intrusion-detection systems often attempt to gain performance by monitoring kernel mode activity. In order to do so, functionality which is typically viewed as application logic is implemented using dedicated device drivers in kernel mode. The approach mentioned in embodiments of the present invention, however, may be implemented without use of dedicated kernel mode components without significantly compromising performance and determinism.

For example, in Windows™ operating systems, embodiments of the systems and methods may be implemented in user mode, eliminating the need to use dedicated kernel mode components, installation procedures and security updates for kernel variants of different operating system versions.

According to an aspect of some embodiments of the present invention, there is provided systems, methods and computer program products for detecting, in runtime, malicious active processes and self replicating executable binary files suspected as malware on a computing device. The computer program instructions are all implemented in User Mode.

The systems and methods may be implemented by monitoring and maintaining one or more lists of records, each representing file creation and/or modification operations. The records are matched against identifying details of active processes which are monitored at runtime, along with their respective executable binary files. Alerts may be raised upon identification of suspected replicating processes, also referred to herein as cloners. Such processes may be monitored, suspended or terminated according to user requests and/or a defense policy dictated to automatic security agents residing on the hosting device.

Strength, speed and concurrent processing abilities of modern processors along with search methods and analysis heuristics are employed to perform calculations required for identification of malicious behavioral patterns of processes at runtime. Suspected malware detection may be performed at runtime without prior knowledge of specific file signatures and/or low level instruction sequences indicating self-replication intent.

Some embodiments of the present invention may serve as first line of defense against malware, as they aim towards effective detection and prevention of replicator process's actions before its one or more cloned process replicas are launched. Some embodiments of the present invention may also serve as a second line of defense, detecting cloned process replicas as they are being created or before the replicator process terminates.

Executable binaries and self-replicating active processes having malicious behavioral patterns may be suspected as or identified as malware according to malware-recognition heuristics, and will be referred to herein by the general names of malware files and malware processes respectively. Self-replicating active processes having malicious behavioral patterns may be monitored, halted, intercepted, terminated and/or the like. Malware files may be isolated for inspection, redirected, permanently deleted and/or any other action which conforms to a device's defense policy. Some embodiments of the present invention may serve as a second line of defense (SLD) for infected files which may be disguised as non-executable binaries.

Selection of the term 'data file(s)' in this application attempts to make a distinct differentiation between 'executable binary files' which may be identified as self-replicating executable binaries of malware, and all other types of files. The term 'data file(s)' as used in this application is generic, and refers to all files which are not executable binary files. Data files may be of different types, for example and without limitation application configuration files, picture files, or the like.

The term "user mode" as used herein refers to application software that runs in user space. A conventional computer operating system segregates virtual memory according to various protection rings, typically divided into kernel space and user space. While kernel space is strictly reserved for running the kernel, kernel extensions, and most device drivers, user space is the memory area where all user mode applications work and can be swapped out when necessary.

The term "executable binary file" as used herein may also refer to a file or file fragment containing executable code and disguised as a non-executable file.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
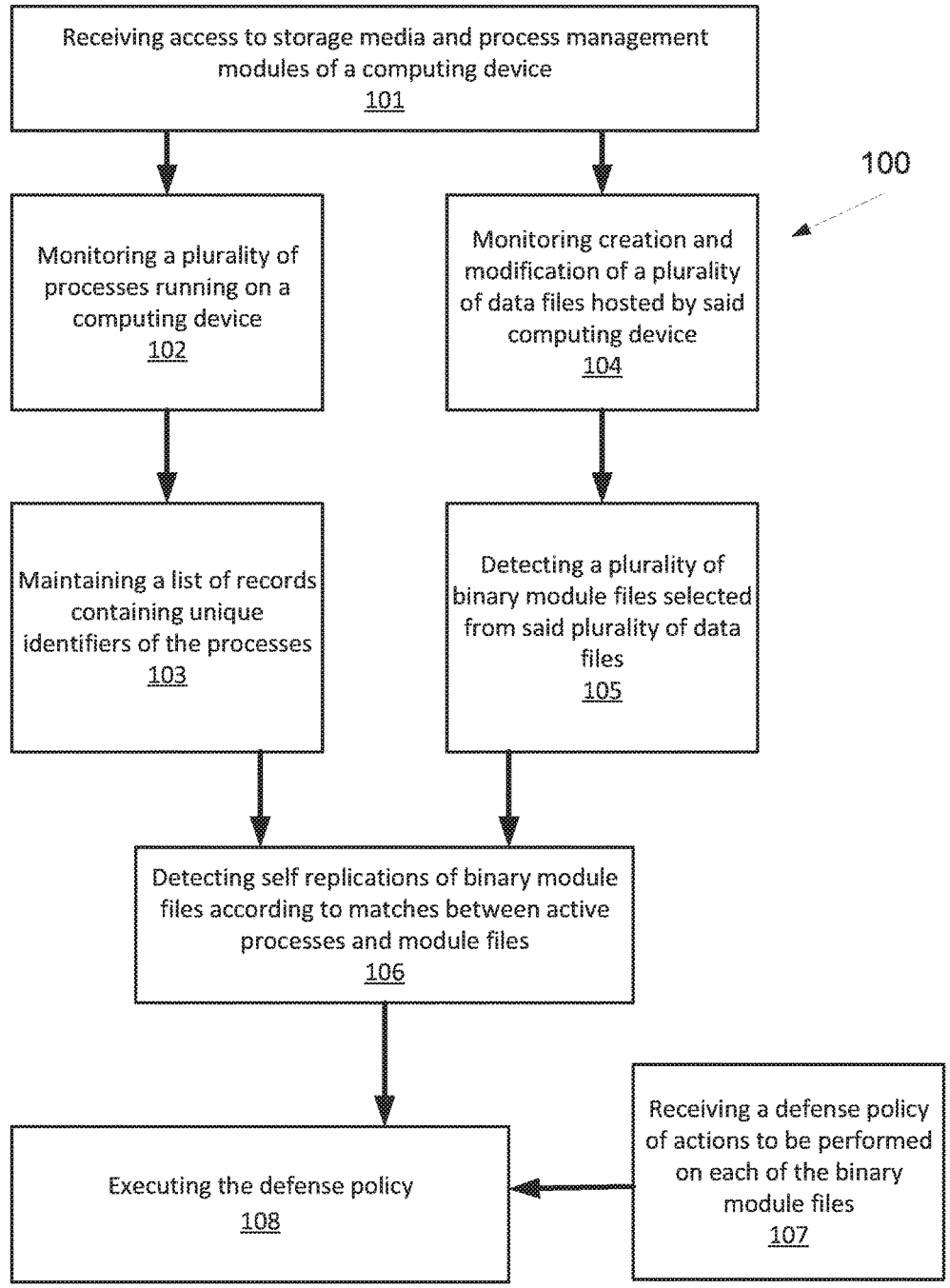
FIG. 3 is a flowchart of a computerized method for detecting self replicating malware at runtime, according to some embodiments of the present invention.

Reference is made to FIG. 3, which is a flowchart of a computerized method 100 for detecting self replicating malware at runtime, according to some embodiments of the present invention. The method 100 enables detection of executable binary files upon file creation and/or modification, matching of the executable binary files to self replicating processes, and optional execution of a defense policy for each of the identified executable binary files.

Figure 4:
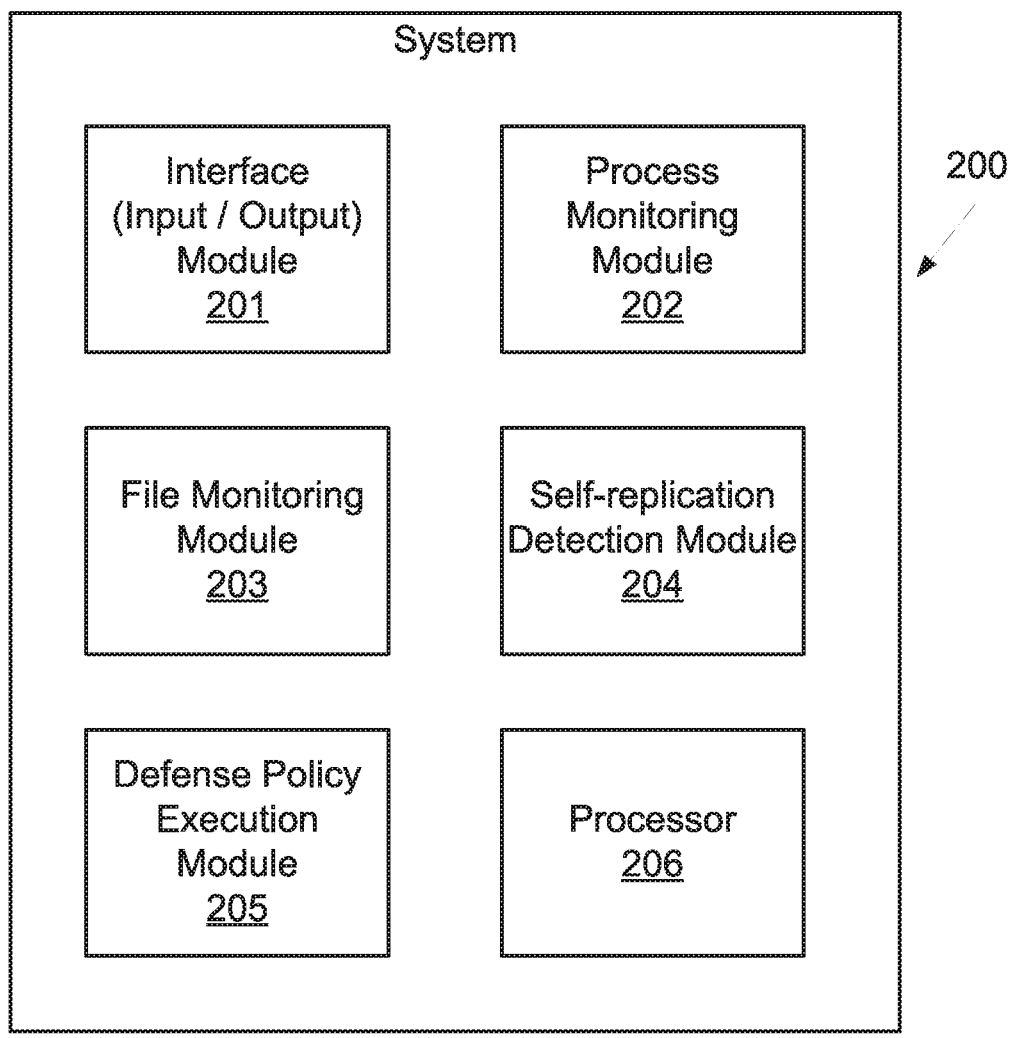
FIG. 4 is a relational view of software and hardware components of a system for detecting self replicating malware at runtime, according to some embodiments of the present invention.

Reference is also made to FIG. 4, which is a relational view of software and hardware components of a system 200 for detecting self replicating malware at runtime, according to some embodiments of the present invention. The system 200 includes an interface serving as an input and/or output module 201, a process monitoring module 202, a file monitoring module 203, a self-replication detection module 204, a defense policy execution module 205, and a processor 206. For brevity, it should be noted that computing functions described herein may be performed using the processor 206.

The method 100 and system 200 may be implemented as a software or hardware component or platform, an add-on to an existing software or hardware platform, and/or as a software as a service (SaaS) which provides services for users via client terminals. Embodiments of the system and method may be installed on a local computing device, a main terminal capable of connecting with one or more computing devices on a network, or alternatively provide cloud services to remote computing devices.

As shown in numeral 101 of FIG. 3, the interface 201 acquires, for example receives or accesses, access to storage media and process management modules of a computing device.

Then, as shown in numerals 102 and 103 of FIG. 3, the process monitoring module 202 monitors in runtime processes running on the computing device and maintains a list of records containing unique identifiers of the processes. Each unique process identifier may include process execution information, such as but not limited to a binary file path storing the binary instruction set of the process.

As shown in numerals 104 and 105 of FIG. 3, the file monitoring module 203 monitors in runtime creation and modification of files hosted by the computing device, and identifies executable binary files selected from the files. Executable binary files may be identified using prior art techniques, for example according to predefined file patterns, specific header structures, embedded Multipurpose Internet Mail Extension (MIME) information, file extensions as used by operating systems, content as used by Forensic applications, or the like. A list of records, each representing an executable binary file, may be maintained and updated upon detection of creation and/or modification of an executable binary file.

Each record may contain one or more unique file identifiers, which may consist of a file path of the detected executable binary file. It should be noted, however, that the file path indicating the executable file from which the process is created cannot serve as the process's unique identifier without using additional process data to diffuse possible ambiguity, because multiple processes may share similar executable file paths. A unique file identifier may be referred to herein as a footprint of a file, and may be identified according to a memory address corresponding to a point in the code of a computer program intended as a destination of a long jump, AKA an entry point as defined in operating systems such Windows™ and/or Unix™.

Then, as shown in numeral 106 of FIG. 3, the self-replication detection module 204 detects self replications of the executable binary files according to matches between records in the active processes list and the module files list, for example by comparing the unique file identifiers of a self-replicating process suspected as malware and respective identifiers of executable binary files, for example file paths. The self-replication detection module may issue an alert to a user or a defense mechanism regarding each of the self replications of the executable binary files.

Self replication in itself is an abnormal activity which has virtually no legitimate use in a working environment. Other indicators of malicious intent may include file attributes such as unusual version-related information, suspicious publisher's signature or certificate, unusual entropy of the file (either extremely high or extremely low), unusual filename extension (where the file was determined to be executable), and proximity between the suspected cloner process creation event and the file replication event. Examination of file content may yield indicators such as the presence of certain binary sequences or certain strings, unusual content of certain header fields or sections within the body of the file, traces of packing and/or encoding within the file, code sequences within non-code sections of the file, and suspicious content embedded as 'resources' within the file.

The file monitoring module 203 and/or self-replication detection module 204 act as a monitoring agent, and may further consult with a database which contains information such as but not limited to known suspicious patterns, legitimate and illegitimate applications, and publishers' credibility ratings to determine file legitimacy. The database may be stored either locally or remotely, and may be updated by internal and external applications.

As shown in numerals 107 and 108 of FIG. 3, the interface 201 may also acquire, for receive or access one or more defense policy of response actions to be performed on each of the executable binary files suspected as malware and/or each of the active processes suspected as malware.

The defense policy may dictate process response actions such as but not limited to monitoring, suspending, and terminating malicious active processes. Similarly, the defense policy may dictate file response actions to be performed on self-replicating executable binary files suspected as malware. File response actions may include one or more actions of deleting, overwriting, marking, monitoring or the like. The defense policy may further suggest that alerts to users and/or automated defense mechanisms will be issued upon execution of response actions.

Response actions may include suspension of a suspected process until heuristic indications are received regarding the severity and fidelity of the suspected threat which is posed by the self replicating executable binary file suspected as malware. Unlike termination of a process and/or immediate deletion of its respective suspected file, suspension of the process may allow for further heuristic analysis of the file to receive a stronger indication of the nature of the suspected file, as will be illustrated in detail herein below. Additional heuristics may be used for establishing decision criteria which may be used to dictate a defense policy.

When a suspect process is suspended, various values may be retrieved from the executable binary file, such as sequences of machine code instructions which imply self replication and/or malicious actions. This further step is typically resource consuming, and may therefore be performed when the suspect process is suspended, to further decrease the chance of a false positive identification. Suspension of a suspect process also assists in retrieving additional information, such as blacklists which assist in determining actions to be performed on a suspected suspect process, or whitelists of well known file patterns which do not require further intervention and/or process termination.

Different heuristics may be applied to achieve a predefined, a semi-recursive or a recursive heuristic analysis process. As part of the heuristic analysis, self replication serves an initial indication which will be referred to herein as a first line of defense, and additional heuristics may each be applied one or more times to achieve a second line of defense (SLD).

Heuristics may be simplistic or complicated, and may include examples such as but not limited to:

File self-replication as discussed above;

File extension validity check: identifying a self replicating binary file which does not end with a well-known executable suffix (such as .exe, .dll, .cmd or the like) may serve an indication of malicious intent.

Proximity timestamp indication: proximity between the timestamp of a process creation event and the timestamp of an executable binary file creation or modification event may serve as a heuristic indication of a causal link between the two events, given a matching footprint.

Other indicators may include unusual content of certain header fields or sections within the body of the file, unusual version-related information, suspicious publisher's signature or certificate, unusual entropy of the file (either extremely high or extremely low), the presence of certain binary sequences or certain strings.

The file monitoring module 203 and/or self-replication detection module 204 acting as a monitoring agent may further consult with a database of known suspicious patterns as mentioned hereinabove. The accumulation of positive indicators serves to assess the severity and the fidelity of the suspected file and/or process, which are the main criteria in determining a response action to be taken.

A defense policy execution module 205 may then execute the defense policy for some or all of the malware processes and/or executable binary files suspected as malware. The range of actions authorized to a defense policy may vary, and the required privileges should match the active defense policy. Elevated privileges are required for full process control defense policies (e.g. suspending or terminating a process, erasing files and the like). Weaker privileges may suffice for a 'report and alert only' defense policies. In a conceivable Software as a Service (SaaS) implementation of the present invention, the privileges may possibly be restricted.

The monitoring module 203 acts as a process monitor, and maintains a list of records. On each process creation event, the process monitor adds a record with a unique identifier which may be the timestamp of the process-creation event. The process monitor may add one or more additional useful values to the record, for example and without limitation the numeric process ID maintained by the operating system, the process name, the file path of the process' executable binary file or the like.

The process monitor reads the executable binary file and searches for additional values, most notably the address-of-entry-point and similar fields from the file's header. These values serve as an initial footprint which may not be unique to a single process, but may serve as an indication of self-replication.

False positive identifications of self replicating executable binary files may be decreased using one or more heuristic indications such as indicated above. Heuristic analysis may be applied multiple times or recursively to a single file. Each such indication may serve as a basis for applying initial protection measures, such as but not limited to suspending the suspected cloner process.

In some embodiments of the present invention, the monitoring module 203 acts as a file monitor which monitors general file creation and/or file modification events. On each event, the file monitor obtains the file path of the relevant file, and reads the file. The file monitor may then check for the existence of a proper binary executable file header to decide whether the relevant file is a binary executable file.

When a binary executable file is detected, values from the binary executable file's header are obtained, for example the address of entry point or the like. The file monitor may then generate a record for each executable binary file creation or modification event. The record comprises a timestamp of the event, the full file path of the executable binary file, and the relevant fields which serve as a footprint.

This information is checked by the file monitor against the global process list maintained by the process-monitor and the first line of the defense is activated when a match is found between footprints of the current file creation/modification event and a record within the global process list. As mentioned earlier, proximity of the timestamps of the two events may serve as a heuristic indication of self-replication.

In cases where the defense mechanism detects a suspected situation but fails to suspend or terminate the cloner process on time, a second line of defense (SLD) may be activated: The process monitor checks on every new process whose executable file path matches the stored value of a recent file creation or modification event which was detected as suspect. Timestamp proximity between the two events may serve a heuristic indication of self-replication, but in this case it is less important since the 'suspect' flag was already raised. In the second line of defense, the process-monitor may asynchronously perform actions such as but not limited to suspending the suspect clone process, terminating it, or just logging the event for future analysis.

Figure 5:
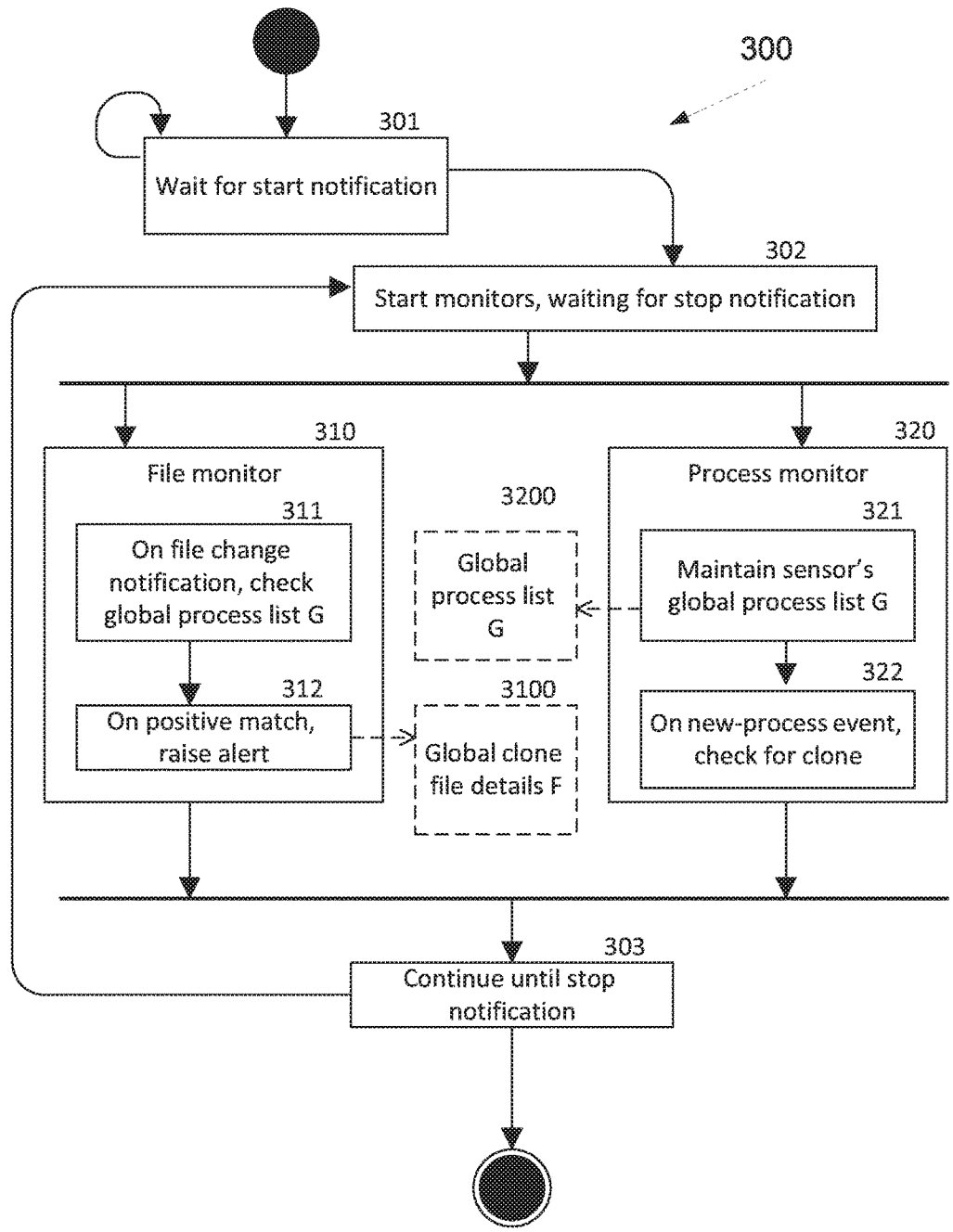
FIG. 5 is a flowchart of a logical implementation of a computerized method for detecting self replicating malware at runtime, according to some embodiments of the present invention.

Reference is now made to FIG. 5, which is a flowchart 300 of a logical sensor implementation of a computerized method for detecting self replicating malware at runtime, according to some embodiments of the present invention. As shown in numeral 301, a logical sensor waits for a 'start monitoring' notification to begin process and file monitoring as shown in numeral 302, until a 'stop monitoring' notification is received as shown in numeral 303. Parallel monitors optionally implemented as process threads are launched, as demonstrated in numerals 310 for file monitoring and 320 for process monitoring. Numeral 3100 represents a global list of clone files F maintained by file monitor 310, and numeral 3200 represents a global list of process files G maintained by process monitor 320.

As shown in numeral 311, upon reception of 'file change' or a 'file create' notifications, the file monitor checks whether the new or modified file is an executable file having a matching record in global process list 'G' 3200. Such a matching record indicates a running process whose executable file has the same footprint as the new or modified file. As shown in numeral 312, in case of a match, the file monitor 310 may suspend the suspected cloner process, notify or raise an alert, and allow a user or an automated agent to execute a defense policy on the suspected cloner process or to release it. The file-monitor may further also store the details of the clone file in the global list of clone files 3100.

Concurrently, as shown in numeral 321, the process monitor 320 continuously maintains and updates the logical sensor's global process list G 3200. As shown in numeral 322, upon detection of a new process, the process monitor 320 checks for the presence of a clone file by searching for a match in the global list of clone files 3100. This may serve as second line of defense: on a positive match the file-monitor may suspend the suspected clone process and raise an alert to notify a user and/or an automated agent, such that a defense policy indicating whether the cloned process should be terminated or released may be executed.

Figure 6:
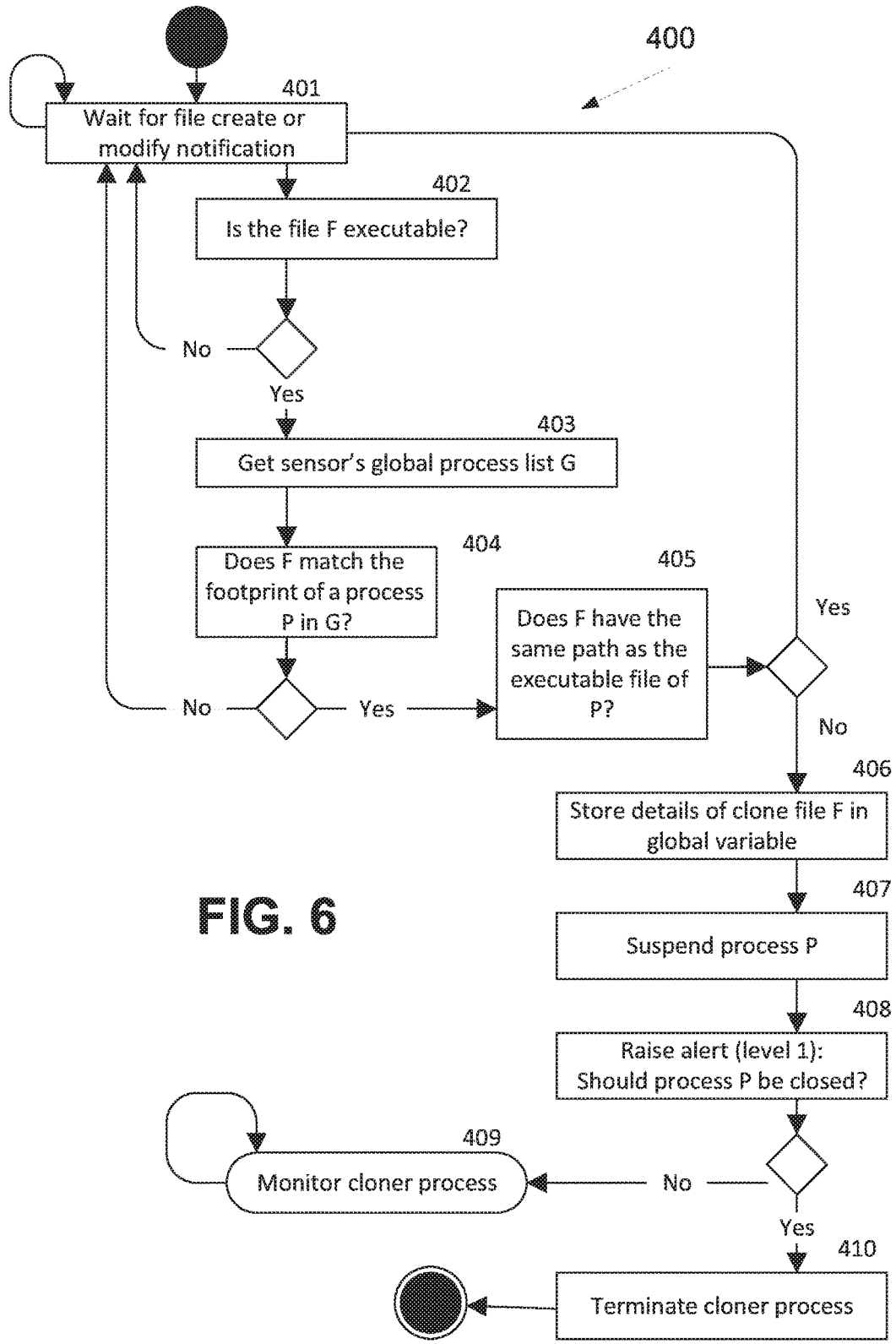
FIG. 6 is a flowchart of a logical implementation of a file monitoring procedure used by a method for detecting self replicating malware at runtime, according to some embodiments of the present invention.

Reference is now made to FIG. 6, which is a flowchart 400 of a logical implementation of a file monitoring procedure used by a method for detecting self replicating malware at runtime, according to some embodiments of the present invention. As shown in numeral 401, a file monitor waits for 'file-modify' or 'file-create' notifications. As shown in numeral 402, when such notifications arrive, the file-monitor retrieves the path of the new or modified file name, reads it into memory and checks whether it is an executable file. As shown in numerals 403 and 404, the file monitor accesses a global process list 'G' (3200 in FIG. 5) created and maintained by one or more logical sensors, and searches within process list G for a process P whose footprint matches the footprint of the new or modified file F. In some embodiments, the footprint may be the 'address of entry point' field of the executable file or a pre-defined sequence of machine-code which indicates self-replication.

If a match is not found, the file monitor returns to wait for 'file-modify' or 'file-create' notifications, as previously described in numeral 401. As shown in numeral 405, if a match is found, the file monitor checks whether the new or modified file F has the same path as the executable P. As shown in numerals 406 and 407, if the paths are not identical, the file monitor stores details of the suspected clone file F for a later use, and suspends the suspected cloner process P. As shown in numeral 408, the file monitor raises an alert and optionally consults with a defense policy, a user or an automated defense agent to determine whether the cloner process should be monitored as shown in numeral 409 or terminated as shown in numeral 410.

Process P which is suspected of cloning file F may be terminated. An alert may be raised to assist in eliminating false positive results. The alert may include details such as but not limited to the name and process ID of the suspect process P, its executable file path, and the path of the new or modified file F. The alert may also include high resolution timestamps of the file-monitor's event and the process-monitor's event, since a small difference between timestamps increases the likelihood of causal connection between them. The alert may also indicate deviations from the characteristic executable file extension or file attribute, as such deviations in a file which is intrinsically executable, is a strong indication of malicious intent.

Figure 7:
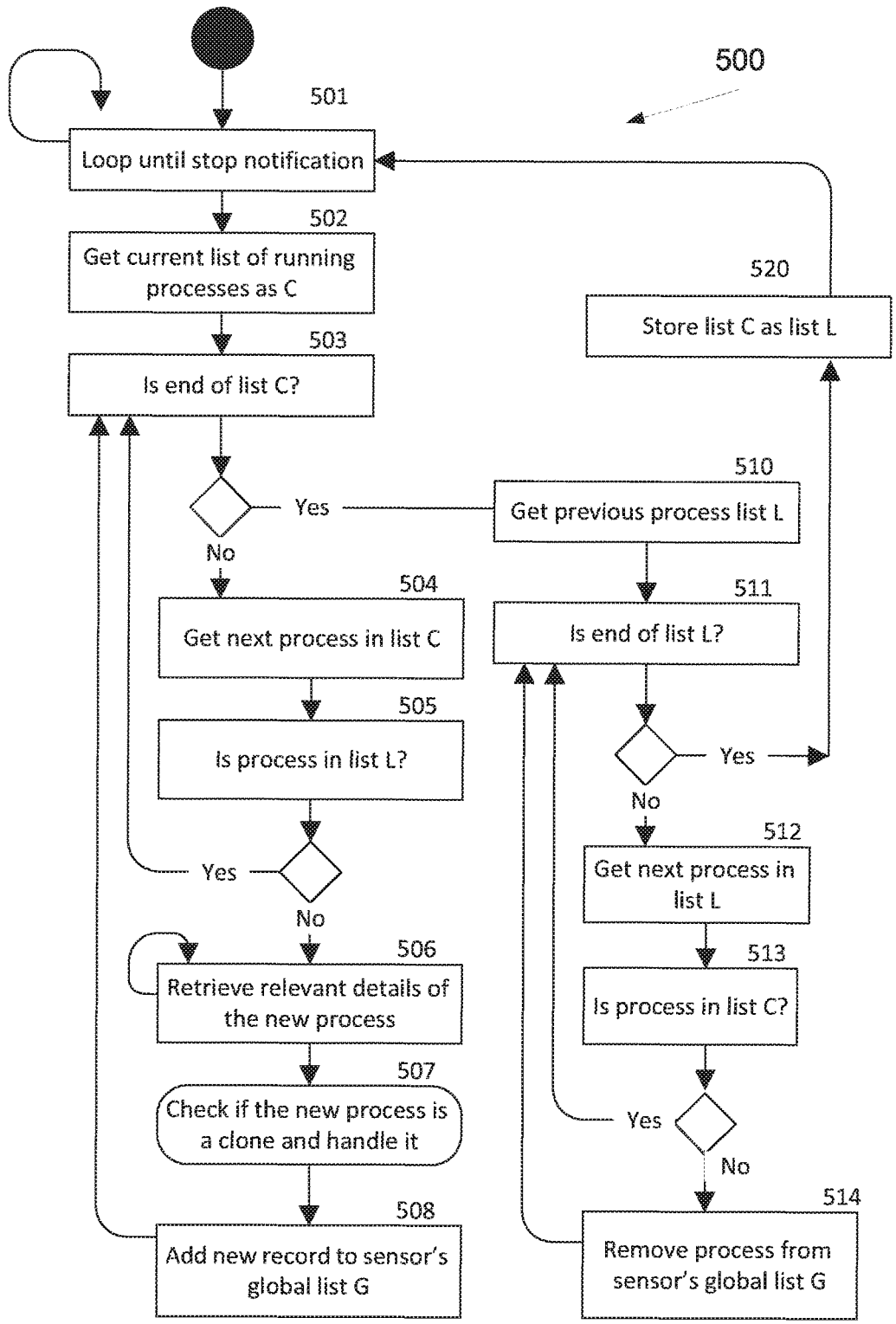
FIG. 7 is a flowchart of a logical implementation of a process monitoring procedure used by a method for detecting self replicating malware at runtime, according to some embodiments of the present invention.

Reference is now made to FIG. 7, which is a flowchart 500 of a logical implementation of a process monitoring procedure used by a method for detecting self replicating malware at runtime, according to some embodiments of the present invention. As shown in numerals 501, 502 and 503 the process-monitor iterates until a 'stop' notification is received, such that in each iteration an updated list of running processes 'C' is obtained until the end of list 'C' is reached.

As shown in numerals 504 and 505, as long as there are records in list 'C', the process-monitor gets the next process P from the list 'C' and checks whether P is already listed in the last process list 'L', which the list obtained on the previous iteration. As shown in numeral 506, if the process is not listed, P is identified as a new process and the process monitor retrieves relevant details of the new process and its executable file. The details concerning the executable file of the new process are similar to the details obtained by the file-monitor for new or modified executable files, to allow proper comparison between the findings of the two monitors.

While new process P may have already been launched, it may still be in the course of loading and initializing, in which the required information is still unavailable. It should be noted that retrieval of new process details may continue until successful completion or until a pre-defined limit is reached, to avoid endless loops when P is a protected system process or when P is stuck before completing its loading.

As shown in numeral 507, the process monitor checks whether the new process P is a clone and handles it optionally as will be described in detail below in FIG. 8. As shown in numeral 508, the process monitor adds the details of the new process P as a new record to the logical sensor's global process list 'G'. Each such record may contain details relevant to process P such as but not limited to its executable file and a unique event identifier which may also serve as a high resolution timestamp for the event.

As shown in numerals 510, 511 and 512, the process-monitor proceeds with retrieving the previously saved process list 'L' and monitoring each of the listed processes until the end of process list 'L' is reached. As shown in numerals 513 and 514, the process-monitor checks whether P is still listed in the running process list 'C', and accordingly removes the process P from the logical sensor's global process list 'G'. As shown in numeral 520, the running processes list 'C' is later saved as list 'L' of previously saved processes list. Process monitoring continues as described until a 'stop' notification is received.

Figure 8:
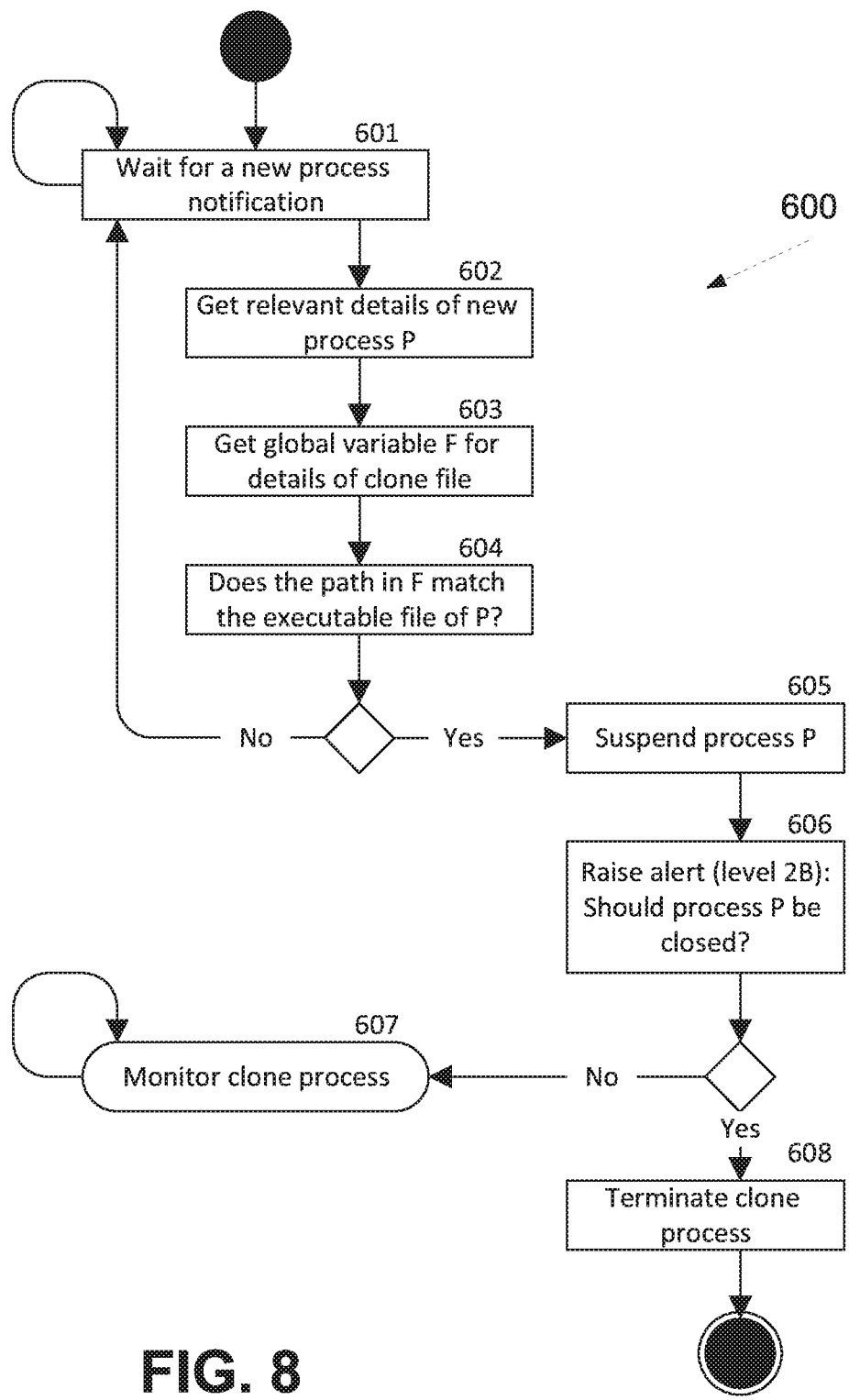
FIG. 8 is a flowchart of a logical implementation of a cloning analysis procedure used by a method for detecting self replicating malware at runtime, according to some embodiments of the present invention.

Reference is now made to FIG. 8, which is a flowchart 600 of a logical implementation of a cloning analysis procedure used by a method for detecting self replicating malware at runtime, according to some embodiments of the present invention. The cloning analysis procedure attempts to detect and suspend a clone process when it is being loaded, serving as a second line of defense (SLD) where the file-monitor has previously detected a cloning operation and has stored the path of the clone file F in a global variable, but has failed to suspend the cloner process prior to launching.

As shown in numerals 601 and 602, the procedure waits for a 'new process' notification and retrieves the details of the new process P which have formerly been retrieved by the process monitor (as described in numeral 506 of FIG. 7). As shown in numeral 603, the details of the clone file F as detected by the file monitor (as described in numeral 411 of FIG. 4) are retrieved. As shown in numerals 604, 605 and 606 the path of the clone file F is compared with the path of the executable file of the new process P. If the paths match, process P suspected as a clone is suspended, a relevant alert is provided such that a defense policy may dictate a decision on which action should be taken, if any, regarding process P. Last, as shown in numerals 607 and 608, according to the dictated action the suspect clone process may be resumed and monitored or alternatively terminated.

Optional implementations of the concepts introduced herein may run on a variety of process architectures and operating systems, for example and without limitation 32 bit or 64 bit Windows™ operated machines. More particularly, on a 64 bit operating system the defender should be compiled as 64 bit binary.

An exemplary implementation is described herein, referring to various .NET objects and methods, as well as some Windows API methods. The concepts and mechanisms described herein may be adapted to other architectural models and operating systems. The description of the defender herein is not meant to be fully detailed or comprehensive, and details are omitted for the sake of brevity while keeping the essence clear.

A conceptual outline of an offender program CLONER.EXE may include activation either by an incautious user or automatically by using some flaw in the operating system. CLONER.EXE may get the path of its own executable file and read it to memory as an array of bytes. CLONER.EXE may review the file header, looking for informative fields which may be modified, and optionally recalculate the checksum to adjust its stored value if needed. CLONER.EXE may also append an arbitrary array of bytes to the end of the original byte array, or it may append or prepend a copy of another file to the original array. It should be noted that there are a variety of options available to CLONER.EXE at this point, if it needs to attach itself to another binary file—either an executable or a media file. Again, the stored checksum can be recalculated and adjusted if needed.

Upon completion of the manipulating the byte array, CLONER.EXE may select an appropriate folder and file name in which the byte array will be saved, possibly overwriting an existing file. The name of the manipulated clone file may have a non '.EXE' extension, such as '.JPG' or the like. The clone will hereby be referred to as 'CLONE.JPG'. CLONER.EXE may activate CLONE.JPG despite its deceiving name-extension. Upon activation, the cloner may provide the clone with command-line arguments or the like. CLONER.EXE may then exit or do more actions. Upon exiting, CLONER.EXE notifies CLONE.JPG.

CLONE.JPG can either delete CLONER.EXE or overwrite it with data, provided that CLONER.EXE did exit. At this point CLONE.JPG is free to take more actions, possibly waiting to be triggered by some external source.

A conceptual outline of a defender mechanism according to embodiments of the present invention refer to a DEFENDER.EXE program, activated by a user or by an administrator or starting automatically as a service, and optionally using 'Run as Administrator' to run the program with elevated privileges. Before actually starting monitoring, if running in elevated modes, the defender calls Process.EnterDebugMode. It also initializes a ManualResetEvent object to serve as a stopper.

The defender launches the process-monitor procedure on a separate thread, and assigns it an 'ideal processor' using SetThreadIdealProcessor, provided that the current machine has more than one processor. Then it launches the file-monitor procedure and assigns it another ideal processor. The process-monitor, running in a dedicated thread, loops on the stopper's method WaitOne as long as the call returns 'false' which terminates the loop or until a specified timeout passes. On each loop, the process-monitor calls Process.GetProcesses to retrieve C, an array of the current running processes. The process-monitor also retrieves L, which is the previously stored array of processes.

The process monitor then passes over C, and for each process P in C it checks whether it is already present in L, provided that L is not empty or null, which would be the case for the first loop. Whenever P is not present in L, the process-monitor adds it to G, which is the defender's global list of running processes. G is made available to the file-monitor which runs on a different thread.

The file-monitor augments the new record with relevant details, including the process ID, name, and the full path and name of its executable file. Then it reads the executable file into a byte array and fetches the value of relevant header fields, such as the address of entry point, and adds those values to the new record. Optionally the file-monitor may check the body of the executable file for a given sequence of machine-code which indicates self-replication. The file monitor also checks to see whether the extension of the executable binary file's name deviates from the standard '.EXE', as such deviation would indicate malicious intention. The file-monitor also augments the record with a unique event identifier which serves as a high-resolution timestamp.

When the process-monitor finishes walking over C, it starts walking over L, and for each process P in L it checks whether it is still present in C. Whenever P is not present in C, the process-monitor removes it from G. When the process-monitor finishes walking over L, it stores C in L and returns to the loop's conditional checking.

The file-monitor, running on its own thread, uses a predefined FileSystemWatcher object to get notifications of file-events by setting the object's property EnableRaisingEvents to 'true'. It also utilizes the predefined delegate FileSystemEventHandler to handle various types of file-events with appropriately customized function. When a file-create or a file-changed event is raised, it is actually being handled by the customized function OnFileChanged, which provides the primary specialized functionality of the file-monitor.

Whenever the file-monitor's OnFileChanged is called, it fetches the full path and name of the involved file F, verifying that it is not a directory and that the file exists, and reads the file into a byte array. It then checks to see whether F has a proper PE signature, which indicates that F is an executable binary file, regardless of its name's extension. A deviation from the standard '.EXE' for executable binary files may serve as an indication of malicious intent.

If the file F is executable, the file-monitor fetches the value of relevant header fields, such as the address of entry point which would serve as a footprint, and then possibly search the file for a given sequence of machine-code which indicates self-replication. Then, the file-monitor retrieves G, the defender's global list of running processes which is concurrently maintained by the process-monitor. The file-monitor queries G for a process P whose executable file's footprint matches the footprint of F, thus indicating possible self-replication.

When a matching process P is found in G, the file-monitor may terminate P right ahead, or suspend P and raise an alert.

The alert contains the identifying details of the suspect process P and the cloned. The alert is made either in human readable form or in machine readable form for use with a specialized agent that can further analyze P and F.

Suspension of P may be enabled by enumerating its threads, obtaining their handles through OpenThread, and then calling SuspendThread on each thread, storing its handle in an array in case it would later be resumed. Terminating P is done by calling either the Kill method of the .Net 'Process' object or by calling the Windows API TerminateProcess on the process handle, obtained through OpenProcess. After raising an alert, the file-monitor may wait for instructions, according to which it can either terminate the suspect process P and cleanup the cloned file F, or alternatively resume P, and keep monitoring P and F if they are not totally cleared. At this point OnFileChanged may exit, while the FileSystemWatcher object keeps watching for further file events, until the file-monitor receives a 'stop' notification.

Embodiments of the present invention may serve as first or a second line of defense against malware, enabling effective detection and prevention of replicator process's actions before its one or more cloned process replicas are launched, or alternatively detecting cloned process replicas as they are being created or before the replicator process terminates.

It is expected that during the life of a patent maturing from this application many relevant file monitoring and process monitoring tools will be developed and the scope of the terms is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for detecting malicious active processes and self-replicating executable binary files on a computing device in runtime, the method comprising:
    executing a code on at least one hardware processor for:
        monitoring at least one of a file creation event and a file modification event held by an operating system executed in a user mode on said at least one hardware processor to detect a plurality of executable binary files;
        monitoring new process creation events of a plurality of active processes executed by said operating system executed in said user mode on said at least one hardware processor;
        detecting in said user mode at least one match between one of said plurality of active processes and one of said plurality of executable binary files;
        detecting in said user mode at least one self replication event of said plurality of executable binary files according to an analysis of said at least one match; and
        suspending or terminating at least one of said plurality of active processes in said user mode based on a comparison between said at least one self replication event and at least one known suspicious pattern.

2. The method of claim 1, wherein a plurality of logical sensors are used to perform said monitoring at least one of a file creation event and a file modification event and said monitoring new process creation events of a plurality of active processes.

3. The method of claim 1, further comprising receiving and executing a defense policy of performing at least one response action upon detection of said at least one active process and said at least one self-replicating executable binary file.

4. The method of claim 3, wherein said at least one response action is a file response action selected from a group consisting of deleting, overwriting, marking, and monitoring said at least one self-replicating executable binary file.

5. The method of claim 3, wherein said at least one response action is a process response action selected from a group consisting of monitoring, suspending, and terminating said malicious active processes suspected as malware.

6. The method of claim 3, wherein said defense policy further comprises issuing at least one alert regarding execution of said at least one response action.

7. The method of claim 1, wherein said suspending or terminating is held according to an outcome of a heuristic analysis of said one of said plurality of executable binary files.

8. The method of claim 1, further comprising maintaining a binary files list of said plurality of executable binary files and an active processes list of records of said plurality of active processes; and detecting at least one self replication event comprises comparing records in said binary files list and said active processes list.

9. The method of claim 1, further comprising comparing said at least one known suspicious pattern with records of a database to determine a defense policy; wherein said suspending or terminating are performed according to said defense policy.

10. The method of claim 9, wherein records of said database contain information selected from known suspicious patterns, legitimate and illegitimate applications, and publishers' credibility ratings.

11. The method of claim 9, wherein said at least one known suspicious pattern is used to assess severity and fidelity of said self-replicating executable binary file and wherein said severity and fidelity serve as criteria in determining a response action to be taken by said defense policy.

12. A computer program product for detecting in runtime malicious active processes and self replicating executable binary files suspected as malware on a computing device, said computer program product comprising a non-transitory computer readable non-transitory storage medium storing program code thereon for use by a processor, the program code comprising;
first program instructions for monitoring at least one of a file creation event and a file modification event held by an operating system executed in a user mode on at least one hardware processor to detect a plurality of executable binary files;
second program instructions for monitoring new process creation events of a plurality of active processes executed by said operating system in said user mode on said at least one hardware processor;
third program instructions for detecting in said user mode at least one match between one of said plurality of active processes and one of said plurality of executable binary files;
fourth program instructions for detecting in said user mode at least one self replication event of said plurality of executable binary files according to an analysis of said at least one match; and
fifth program instructions for suspending or terminating at least one of said plurality of active processes in said user mode based on a comparison between said at least one self replication event and at least one known suspicious pattern.

13. A system for detecting in runtime malicious active processes and self replicating executable binary files suspected as malware on a computing device, the system comprising:
a memory storing a code;
at least one hardware processor coupled to said memory for executing the stored code, the code comprising:
program instructions for monitoring at least one of a file creation event and a file modification event held by an operating system executed in a user mode on said at least one hardware processor to detect a plurality of executable binary files;
program instructions for monitoring new process creation events of a plurality of active processes executed by said operating system in said user mode on said at least one hardware processor;
program instructions for detecting in said user mode at least one match between one of said plurality of active processes and one of said plurality of executable binary files;
program instructions for detecting in said user mode at least one self replication event of said plurality of executable binary files according to an analysis of said at least one match; and
program instructions for suspending or terminating at least one of said plurality of active processes in said user mode based on a comparison between said at least one self replication event and at least one known suspicious pattern.

14. The system of claim 13, wherein said code which is executed by said at least one hardware processor comprises program instructions for acquiring and executing at least one defense policy of a plurality of response actions to be performed on said at least one active process.

* * * * *